3,377,307
PROCESS FOR THE DRESSING OF LEATHER
Günter Kolb, Cologne-Stammheim, and Kurt Eitel, Leverkusen, Germany, assignors to Farbenfabriken Bayer Aktiengesellschaft, Leverkusen, Germany, a corporation of Germany
No Drawing. Continuation of application Ser. No. 32,521, May 31, 1960. This application July 22, 1966, Ser. No. 567,319
Claims priority, application Germany, June 4, 1959, F 28,605
5 Claims. (Cl. 260—29.7)

ABSTRACT OF THE DISCLOSURE

This invention relates to dressing compositions for leather based upon a butadiene copolymer having a particular ratio of monomers. The polymers impart improved heat and solvent resistance to the leather coating and consist essentially of a copolymer of (a) 30–50% by weight of an aliphatic conjugated diene having 4 to 6 carbon atoms (b) 5–10% by weight of a member selected from the group consisting of acrylamide and its α-substitution products and (c) 65–40% by weight of at least one further monoethylenicaly unsaturated monomer which is copolymerizable with said conjugated dienes.

---

This application is a continuation of application S.N. 32,521, filed May 31, 1960, now abandoned.

The present invention relates to new and useful leather dressing agents and to a process for the dressing of leather therewith. The new leather dressing agents are generally aqueous emulsions of mixed or copolymerisates.

It is already known to use certain aqueous butadiene-containing mixed or copolymerisate emulsions for the dressing of leather. E.g. according to British patent specification 678,614 such mixed polymerisate emulsions are used which contain butadiene and acrylonitrile and in British patent specification No. 777,293 there are described butadiene-dichloroethene-mixed polymerisate emulsions for the dressing of leather. When used according to known methods for the preparation of leather such aqueous mixed polymerisates yield leathers of excellent resistance to breaking and bending, fine grains, good gloss and good adhesion. Moreover, these dressings result in a good finish of the leather and a soft feel.

It is known, however, that these mixed polymerisates, notwithstanding their excellent properties, do not in all cases meet the requirements of practice. They are sensitive, for example, to solvents such as acetone or carbon tetrachloride and to heat. They are e.g. not always resistant to mechanical stress after the action of acetone such as occurs upon the insertion of acetone-impregnated shoe puffs in the leg, or to mechanical action at temperatures above 120° C. such as occurs often during the pinching of shoes.

In accordance with the present invention it has now been found that leather dressings which, while retaining the advantageous properties of the known butadiene mixed polymerisates, are fast to solvents and heat, are obtainable with the aid of aqueous mixed polymerisate emulsions by using mixed polymerisates which are produce from 25–60% of conjugated dienes, 2–20% of acrylamide and/or its α-substitution products and 73–20% of at least one further compound copolymerisable with conjugated dienes.

The polymerisation of the above said monomers is carried out according to generally known methods preferably in an aqueous emulsion as a so-called mixed polymerisation or graft-copolymerisation. Known anionic, cationic or non-ionic emulsifiers, may also be added protective colloids such as polyvinyl alcohols, polyvinyl pyrrolidones, polyacrylic acid salts and/or other similar substances. The polymerisation is carried out in known manner by the addition of known radical-forming substances or also of so-called redox systems.

As conjugated dienes in the meaning of this invention there are to be understood e.g. compounds such as butadiene, isoprene, 2,3-dimethylbutadiene, 2-chlorobutadiene, 2,3-dichlorobutadiene, 2-cyanobutadiene and similar substances. As α-substitution products of acrylamide if there are needs there may be considered, for example, methacrylamide, α-ethylacrylamide, α-dodecylacrylamide, α-chloroacrylamide, α-cyano acrylamide, α-carboxy-acrylamide, etc. As compounds copolymerisable with conjugated dienes there may be mentioned, inter alia, acrylonitrile, α-chloro-acrylonitrile, styrene, α-methylstyrene, acrylic acid, methacrylic acid, α-chloroacrylic acid, alkyl esters of acrylic acid and α-alkyl acrylic acid, N-alkyl- and N,N-dialkylamides of acrylic acid and α-alkylacrylic acids, esters or semiesters of maleic acid and fumaric acid, vinyl esters of carboxylic acids such as vinyl acetate and vinyl propionate, unsaturated halogenated hydrocarbons such as vinylidene chloride, vinyl pyridine, isobutylene as well as mixtures thereof.

During polymerisation there may be added known polymerisation regulators such as alkyl mercaptans, in order to influence the thermoplastic properties of the polymerisate. The mixed polymerisates according to the invention are expediently treated prior to use with so-called stabilizers, for example with condensation products of cresols with camphene, 2,6 - di - tertiary - butyl-p-cresol, aralkylation products of diphenylamine, 2,2'-methylene-bis - (4 - methyl - 6 - cyclohexylphenol) and the like. The quality of stabilizer should be at least 0.5%, but not more than 5% referred to the proportion of polymerisate of the emulsions. It is to be understood that other known low or high molecular latex auxiliaries can be added to the emulsions, in order to influence, for example, their viscosity, stability, drying time, flow or also the properties of the finished leather dressing. Furthermore, the emulsions may also be treated with vulcanizers such as sulfur, sulfur-yielding substances, tetramethyl thiuram disulfide, zinc oxide, and with accelerators or organic peroxides, preferably in an aqueous emulsion.

The dressing of leather with the mixed polymerisate emulsions according to the invention can be carried out in the manner known from the use of other mixed polymerisate emulsions for the dressing of leather, for example by treating the emulsions with the additives customary for the dressing of leather, for example aqueous leather topping colors, and subsequently applying them to the leather to be treated by means of a brush, plushboard or spraying device, and optionally subjecting them to a conventional after-treatment.

Surprisingly it has been found that the leather dressings thus prepared, while retaining the above mentioned outstanding properties of known butadiene mixed polymerisates, yield excellent elastic dressings which are fast to solvents, heat and hot pressing, resistant to bending, wet processing and hot rubbing, highly resistant to, for example, mechanical stress during hot lasting and showing an excellent mechanical resistance also in an acetone-moist state. The combination of these valuable technical properties is not attained either by the known butadiene-containing or by the known butadiene-free polymerisate emulsions. In order to improve the fastness to heat and solvents of the leather dressings also when using known mixed polymerisate emulsions, it is, of course, also possible to blend the mixed polymerisate emulsions according to the invention with known polymerisate emulsions.

The following examples are given for the purpose of illustrating the present invention, the parts indicated being parts by weight.

EXAMPLE 1

Into an aqueous topping color mixture of 100 parts of an aqueous leather topping color (see Bergmann and Grassmann, Handbuch der Gerbereichemie and Lederfabrikation, vol. III, part 1, pages 43 ff.), conventional amounts of lustring agents and plasticizers and 300 to 500 parts of water there are stirred 200–300 parts of the following approximately 35% co-polymerisate emulsion. The mixture thus obtained is then applied to the leather, for example buffed cow hide, by means of a brush, plush board or spray gun and dried. Subsequently a second coat may be applied in the same manner. A third coat by means of a spray gun may lead to an improved levelling of the topping color layer. Finally, a conventional finish is applied. If desired, the aqueous topping color layer may be hardened between the individual coats by applying a 10% formaldehyde solution in the form of a spray coat. The dressing thus obtained possesses the advantageous properties mentioned in the general part of the description The mixed polymerisate emulsion employed is prepared as follows:

4500 parts of butadiene, 4800 parts of acrylonitrile and 700 parts of methacrylamide are emulsified in a solution of 450 parts of potassium stearate and 75 parts of tertiary sodium phosphate in 17.475 parts of water by stirring. The emulsion is polymerized at 35–50° C. with the addition of 60 parts of potassium persulfate.

EXAMPLE 2

To strongly after-tanned box sides deeply buffed with emery paper No. 220 or 400, the following liquor is applied twice by means of a plush board:

Primary coat: Parts
  Aqueous casein color (see Bergmann-Grassmann: Handbuch der Gerbereicheime und Lederfabrikation, vol. 3, part 1, pages 43 ff.) _____ 100
  Water _____ 350
  Mixed polymerisation emulsion (35%) prepared as described below _____ 200

Pressing on a hydraulic press at 70° C. and 150 atu. 2 spray coats with the following mixture:

Spray color: Parts
  Primary _____ ⅔
  Finish _____ ⅓

Finish: Parts
  10% commercial casein gloss _____ 100
  10% blood albumin solution _____ 100
  Water _____ 250
  Mixed polymerisation emulsion as described below _____ 25

2 spray coats, followed each time by immediate hardening with a 10% formaldehyde solution, drying, pressing at 80° C. and 200 atu.

The mixed polymerisate emulsion is prepared as follows: 4500 parts of butadiene, 3000 parts of acrylonitrile, 1750 parts of styrene and 750 parts of methacrylamide are emulsified in a solution of 420 parts of sodium oleate and 100 parts of tertiary sodium phosphate in 17.480 parts of water by stirring. The emulsion is polymerized at 35–50° C. with the addition of 55 parts of potassium persulfate as an activator and 12.5 parts of tertiary dodecylmercaptan as a regulator.

EXAMPLE 3

Vegetable or semichromium tanned skivers are bottomed with the following liquor:

Primary coat: Parts
  Aqueous leather topping color (see Bergmann-Grassmann, Handbuch der Gerbereichemie und Lederfabrikation, vol. III, part 1, pages 43 ff.) _____ 100
  Water _____ 300
  Mixed polymerisate emulsion (35%) as described below _____ 250

2 strong brushed coats, drying, graining.

Spray coat: a conventional collodium color mixture. 1 spray coat, drying, slightly polishing and boarding. The mixed polymerisate emulsion used is prepared as follows:

600 parts of butadiene, 410 parts of acrylonitrile, 265 parts of styrene, 115 parts of acrylic acid butyl ester and 110 parts of acrylamide are emulsified in a solution of 37.5 parts of lauryl sulfonate in 2660 parts of water and polymerized at 35–50° C. with the addition of 9 parts of potassium persulfate.

EXAMPLE 4

Instead of the mixed polymerisate emulsion described in Example 2 there is used a graft copolymerisate emulsion obtained in the following manner:

112.5 parts of methacrylamide, 187.5 parts of acrylic acid butyl ester and 225 parts of styrene are emulsified in a solution of 37.5 parts of a paraffin sulfonate having 12–18 carbon atoms, and 10 parts of an alkylaryl-polyethylene oxide in 2660 parts of water and polymerized at 50° C. by the addition of 9 parts of potassium persulfate. After about 4 hours the yield is 96%. A mixture of 600 parts of butadiene and 375 parts of acrylonitrile is then added under pressure so that the polymerisation temperature does not exceed 53° C. To complete the polymerisation, the mixture is further stirred for 5 hours at 50° C.

EXAMPLE 5

The following mixed polymerisate emulsion is used instead of the one described in Example 3:

An emulsion is prepared by stirring 5000 parts of butadiene, 2500 parts of 1,1-dichloroethane, 1500 parts of acrylonitrile, 1000 parts of methacrylamide, 3500 parts of a 10% aqueous paraffin sulfonate solution, 300 parts of 1 N sulfuric acid and 8900 parts of water. Subsequently polymerisation is carried out at 20° C. with the addition of 50 parts of a paraffin sulfinate as activator and 54 parts of diisopropylxanthogen disulfide as regulator.

EXAMPLE 6

The following graft co-polymerisate emulsion is used instead of the one described in Example 2:

750 parts of methacrylamide, 1500 parts of acrylic acid butyl ester, 1500 parts of 2-chlorobutadiene and 2250 parts of styrene are emulsified in a solution of 400 parts of an alkyl aryl polyethylene oxide in 15000 parts of water and polymerized at 60° C. by the addition of 80 parts of potassium persulfate.

After about 2 hours a yield of 95% is attained. A mixture of 2000 parts of acrylic acid butyl ester and 2000 parts of 2-chlorobutadiene is then added so that the polymerisation temperature does not rise above 65° C. In order to complete the polymerisation, stirring is continued at 60° C. for 3 hours.

EXAMPLE 7

The following mixture serves for example as a primary coat: 100 parts of the binding agent described below, 500 parts of a 0.5% basic dyestuff solution, one brushed coat.

An emulsion is prepared by stirring 3000 parts of butadiene, 3000 parts of acrylonitrile, 100 parts of styrene, 2500 parts of acrylic acid butyl ester, 500 parts of methacrylamide, 150 parts of dodecylamine hydrochloride and 15000 parts of water. Subsequently, polymerisation is carried out at 50° C. by the addition of 50 parts of azo-diisobutyric acid dinitrile.

Among the leather dressing agents of the present invention such are preferred which contain co-polymerisates of (a) conjugated aliphatic hydrocarbons having 4 to 6 carbon atoms, (b) acrylamide and/or α-acrylamide, and (c) acrylonitrile, mono-vinyl aromatic hydrocarbons of the benzene series and/or 1,1-dichloroethene.

We claim:

1. A method for dressing leather comprising applying an aqueous dressing emulsion containing the copolymer consisting essentially of (a) 30–50% by weight of an aliphatic conjugated diene having 4 to 6 carbon atoms, (b) 5–10% by weight of a member selected from the group consisting of acrylamide and its α-substitution products and (c) 65–40% by weight of at least one further monoethylenically unsaturated monomer which is copolymerizable with said conjugated dienes, and drying the treated leather.

2. A method for dressing leather according to claim 1 wherein the (c) component is 65–40% by weight of at least one monoethylenically unsaturated monomer selected from the group consisting of acrylonitrile, styrene, acrylic acid butyl ester and vinylidene chloride, and drying the treated leather.

3. A method for dressing leather comprising applying to leather an aqueous dressing emulsion of a copolymer consisting essentially of (a) 30–50% by weight of butadiene, (b) 5–10% by weight of a member selected from the group consisting of acrylamide and α-substitution products, (c) 25–30% by weight of acrylonitrile, and (d) 11–17.5% by weight of styrene, and drying the treated leather.

4. A leather dressing composition comprising essentially about 100 parts of an aqueous casein color, about 350 parts water and about 200 parts of an akueous emulsion consisting essentially of the polymeric product of about 4500 parts butadiene, 3000 parts acrylonitrile, 1750 parts butadiene, 300 parts acrylonitrile, 1750 parts styrene and 750 parts methacrylamide.

5. A dressed leather treated in accordance with claim 1.

References Cited

UNITED STATES PATENTS

| | | | |
|---|---|---|---|
| 2,375,140 | 5/1945 | Seman | 260—32 |
| 2,887,410 | 5/1959 | Graulich et al. | 117—42 |
| 2,908,658 | 10/1959 | Graulich et al. | 260—29.6 |
| 2,950,216 | 8/1960 | Kolb | 117—142 |
| 2,959,821 | 11/1960 | Kolb | 18—58.6 |
| 3,026,293 | 3/1962 | Caldwell et al. | 117—142 |

MURRAY TILLMAN, *Primary Examiner.*

J. T. GOOLKASIAN, *Assistant Examiner.*